Dec. 25, 1934.     H. F. MAUREL     1,985,512
OVEN FOR BAKING FUEL BRIQUETTES
Filed Dec. 12, 1932     3 Sheets-Sheet 3
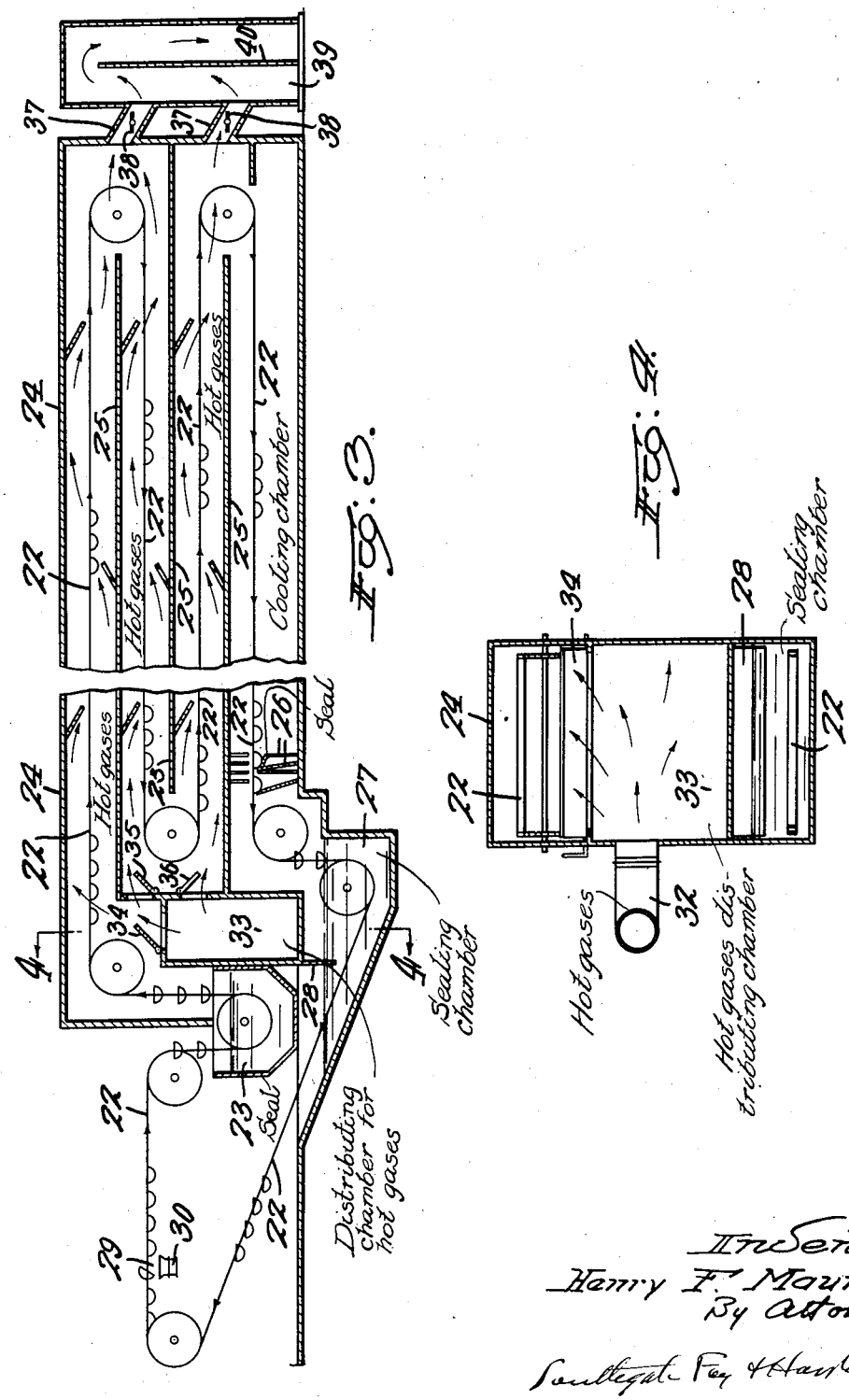

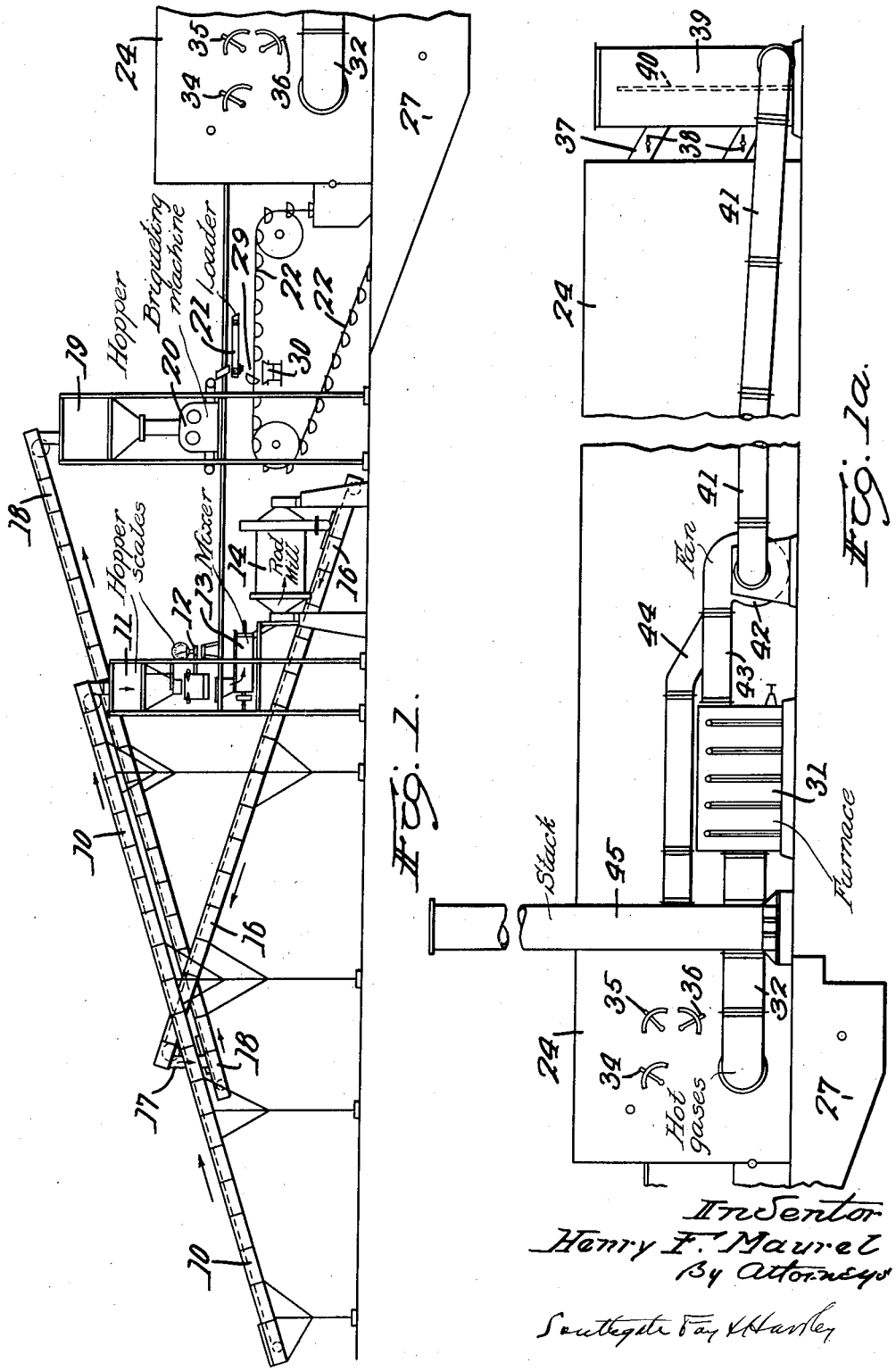

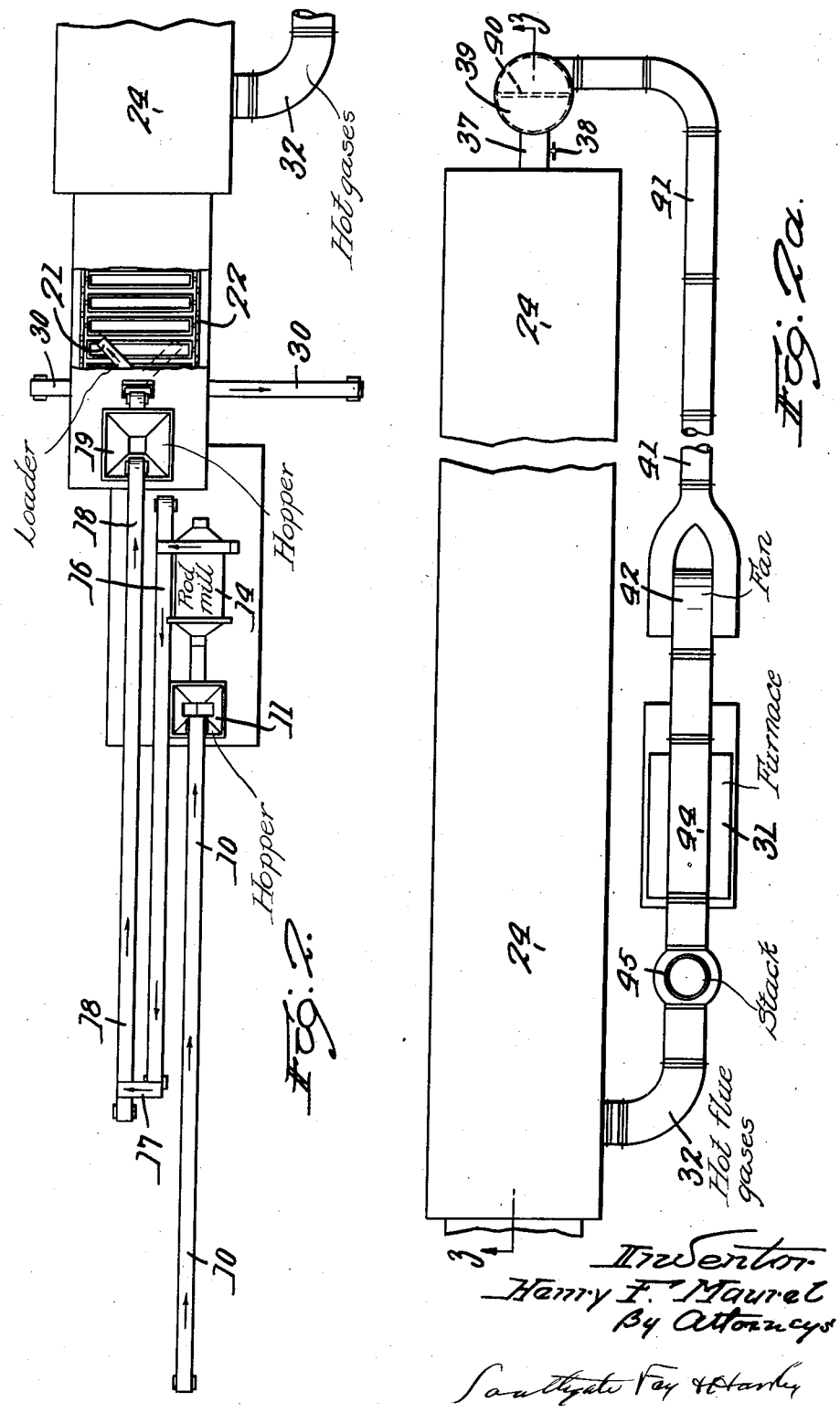

Patented Dec. 25, 1934

1,985,512

UNITED STATES PATENT OFFICE 1,985,512

OVEN FOR BAKING FUEL BRIQUETTES

Henry F. Maurel, Providence, R. I., assignor to Maurel Investment Corporation, Providence, R. I., a corporation of Rhode Island Application December 12, 1932, Serial No. 646,881

2 Claims. (Cl. 202—117)

The principal objects of this invention are to provide for the heat treatment of briquettes for fuel by introducing the heat into the oven in a distributing chamber having means for proportioning at will the volume of gases used for heating separately each strand of the conveyor within the oven; to provide means for controlling the temperature of the gases used for heating by re-circulation of any desired portion of the gases in addition to the regulation of combustion in the heating furnace; to provide means for exhausting the gases and vapors from each strand of the conveyor at the end opposite the intake in such a manner to avoid when desired, mixing gases of one strand with those of another; to provide an arrangement of the bottom strand of the conveyor, whereby the travel of the product takes place in the direction away from the heating gas offtake, to insure an atmosphere free of vapors and permit the drawing in of air at will for better oxidization; to provide for the utilization of one fan to serve the double purpose of exhaust and delivery of heating gases under pressure to the oven; to provide an arrangement of the first conveyor strand whereby after entering the oven, if the oven is being operated without a liquid entering seal, any air accidentally drawn in through the entrance end is exhausted through the offtake before the product has reached ignition temperature, thus preventing the fuel catching fire and upsetting the temperature control; to provide for utilizing part of the conveyor for a cooling and hardening zone outside the oven proper so that practically the entire length of this conveyor is utilized; to combine liquid and labyrinth seals for optional use at the entrance and discharge of the oven, which seals can be filled with water at a moment's notice to prevent the entrance of oxygen and further combustion of the materials in the oven so that fires will be prevented; to provide means whereby the temperature can be controlled accurately in all parts of the oven and the temperature of the gases themselves in the oven is controlled by regulating a series of intakes opening out of the distributing chamber in any desired proportion; to provide an arrangement in which the offtakes for the gases are located in such a way that the travel of the gases and the volume desired through each individual strand is positive; to provide for immediately exhausting the comparatively cold vapors generated around the first and second strands to cause the bottom strand of the conveyor to travel away from the offtake for heating gases so that, by operating the damper in the offtake, any desired amount of free air can be drawn in under perfect control through the lower seal which ordinarily is not filled with water, and to provide a new and improved composition for a fuel briquette.

Other objects and advantages of the invention will appear hereinafter.

Reference is to be had to the accompanying drawings, in which

Fig. 1 is a side view of the loading apparatus for the oven in a device for making fuel briquettes according to this invention;

Fig. 1a is a side view of the oven;

Fig. 2 is a plan of the parts shown in Fig. 1;

Fig. 2a is a plan of the parts shown in Fig. 1a;

Fig. 3 is a vertical central sectional view of the oven on the line 3—3 of Fig. 2a; and Fig. 4 is a transverse sectional view through the distributing chamber on the line 4—4 of Fig. 3.

The invention is shown as applied to a plant in which the raw fuel, preferably a mixture of from

| | Percent |
|---|---|
| Bunker fuel oil | 6 to 9 |
| Bituminous coal | 10 to 25 |
| Anthracite coal or coke | 84 to 66 | is delivered from any desired source to the lower end of a conveyor 10. This conveyor delivers this mixture to the hopper 11 of a set of scales 12 in which all the mixture is weighed. They descend by gravity into a mixer 13 which delivers the product in a continuous stream to a rod mill 14. This rod mill serves the double purpose of grinding the ingredients thoroughly and kneading the same. The product in the form of a shapeless mass is delivered through the outlet of the rod mill to a conveyor 16 which, through a discharge chute 17 delivers it to another conveyor 18. This conveyor delivers the mixture by gravity to a briquette mixing hopper 19 of a briquetting machine 20 which forms the briquettes and delivers them to a loading mechanism 21 which deposits them on the oven conveyor 22.

The conveyor 22 receives the preformed briquettes on the top of the loading strand and takes them down through a seal 23 and directly upwardly to the top of the oven 24. This seal is of such form that liquid can be supplied to it or removed and it will still constitute a labyrinth seal but ordinarily liquid is used in it. The conveyor 22 passes across the top of the oven and then gradually and progressively downwardly over and around a series of horizontal partitions 25. These partitions divide the oven into horizontal compartments and each partition extends to one end of the oven and is spaced from the other end. Along each compartment passes a strand of the conveyor.

Finally the conveyor 22 passes out of the oven at the bottom through a preliminary seal 26 and a seal 27. The seal 27 ordinarily serves as a labyrinth seal but can be supplied with water instantaneously to prevent the entrance of air and oxygen and smother any fire that may occur in the oven. This seal 27 is provided with a partition 28 extending below the water level to keep out the air. The conveyor passes upwardly from this seal a considerable distance and constitutes an external means for cooling the briquettes. Then it passes to the discharge point 29 where the product is discharged into the conveyor or chute 30 and delivered from the machine. In this way practically all of the conveyor 22 is utilized for one purpose or another. There are few idle buckets on the conveyor as they are all used either for heating or cooling with the exception of two or three between the discharge point and the loading point.

The oven is heated by means of a furnace 31 from which extends a pipe 32 for hot flue gases. This pipe or conduit extends into an internal distributing chamber 33 in the oven and delivers the heated gases and products of combustion directly thereto. This distributing chamber is provided with independently controlled dampers 34 and 35 and 36 for outlets in the spaces below the upper strand of the conveyor above the second strand and below the third strand to control at will the volume of gases delivered to each individual strand of the conveyor 22 independently of each other. This arrangement makes it possible to control accurately the temperature in all parts of the oven. What is called the "Master temperature", or the temperature of the gases themselves, is controlled in the furnace 31 in a manner that will be described and the proportion of the heat delivered to the upper and lower and intermediate strands of the conveyor 32 is controlled by the dampers 34, 35 and 36 which are manipulated from outside. The heated gases pass above the three highest horizontal partitions or floors 25 along the chain conveyor to the opposite end of the oven. There they are received in offtakes or conduits 37 which have dampers 38 and pass out of the oven into a chamber 39. These offtakes 37 are located at the end of the oven opposite the distributing chamber 33. The gases therefore travel straight through the oven but are not recirculated but the proportion of heated gases in the different horizontal compartments can be regulated by the several dampers.

In the chamber 39 is a vertical partition 40 and the gases have to pass up over it and out at the bottom through a pipe 41, thus allowing some solid parts of the products of combustion or condensation from products of distillation to settle in this chamber. The pipe 41 extends to a fan 42 which draws the gases, etc. from the oven through this pipe and delivers them through a pipe or conduit 43 to the furnace. Connected with this conduit 43 is an offset pipe 44 controlled by a damper which delivers any desired proportion of these gases into the stack 45, where they are distributed into the air. The rest are recirculated through the furnace 31. This provides an important regulating means.

This apparatus is designed for general purposes but is particularly suitable for producing briquettes of a mixture of anthracite coal or coke and bituminous coal. At least two thirds of the mixture by weight is anthracite coal or coke. The rest is made up of bituminous coal and bunker fuel oil of which the bituminous coal is of from two to three times the weight of the bunker fuel oil. Other binders can be used but I find this one to be particularly suitable for the mixture of the two kinds of coal. With this mixture the baking temperature is kept at a point not over 700° Fahrenheit preferably.

The conveyor is shown as of the pivoted basket type and the loading, as well as the discharging point, is outside the oven. The conveyor enters the oven proper through a liquid seal and rises immediately to the top, traveling back and forth gradually downward over and under a plurality of the horizontal partitions. Thus each strand of the conveyor is located in a separate compartment. The conveyor finally passes out of the oven through another seal which is in the form of a liquid seal but which ordinarily is not filled with liquid. In other words in ordinary use it acts as a labyrinth seal.

The direction of travel of the conveyor, it will be noticed, is completely reversed as compared to my previous Patents 1,870,521, 1,870,523 and British 325,869, accepted March 3, 1930. The discharge point is located so near the loading point that no material part of the conveyor is wasted. All parts of it are used for some purpose in producing the product. The part of the conveyor extending from the discharge seal to the discharge point is employed for cooling the product in the air.

It has been the experience in the briquetting industry that sooner or later ovens are destroyed by fire when, due to mechanical failure during operation, the product catches fire. Under the preferred practice of this invention the entering seal only is filled with water and the outgoing seal is empty. The latter can be filled with water at a moment's notice, thereby sealing the oven tight so that no air can get in. In this way the product cannot catch fire, or, if it does, the temperature remains stationary for a while and gradually drops without causing damage and without allowing the briquettes to burn. Of course, labyrinth seals can be used in place of the water seals without this latter advantage.

One of the most important features of the invention is the distributing chamber located within the oven and having independently controlled dampers or outlets to control at will the volume of gases delivered to each individual strand of the conveyor independently. The offtakes being located at the opposite end from the distributing chamber, the travel of the gases in the volume desired through each individual compartment in which a strand is located is positive. Likewise the comparatively cold vapors generated about the first and second strands are immediately exhausted at the ends of these compartments in which the strands are located. Therefore they are not permitted either to knock down the temperature or contaminate the oxidizing chamber around the lower strand. The conveyor in the bottom strand travels away from its offtake so that, by operating the damper in this offtake, any desired amount of free air can be drawn in under perfect control through the lower seal which ordinarily is not filled with water as stated. This lower strand is a preliminary cooling zone.

Incidentally this arrangement makes it possible to control accurately the temperatures required within the oven and to keep the baking temperature below 700° Fahrenheit. What is called the "Master temperature", or the temperature of the gases themselves, is controlled in the furnace by regulating combustion and in addition by the simple expedient of recirculating through the furnace any desired portion of the waste gases discharged from the oven by the exhaust fan. Any desired amount of surplus can be diverted out through the stack.

It will also be noted that the gases are delivered at any required temperature under forced draft into the distributing pressure chamber 33 and from this chamber distributed in any desired direction to each of the upper strands of the conveyor separately. One fan is used to serve the double purpose of exhausting from the oven and delivering gases under pressure to the oven. The provision of the intake for the first or upper conveyor strand at its end insures that if the oven is being operated under a liquid entering seal, any air accidentally running into the seal is exhausted before the product has reached ignition temperatures. This prevents the product catching fire and upsetting the temperature of the coal.

Although I have illustrated and described only one form of the invention I am aware of the fact that modifications can be made therein by any person skilled in the art without departing from the scope of the invention as expressed in the claims. Therefore I do not wish to be limited in this respect otherwise than as set forth in the claims but what I do claim is:

1. In an oven for baking fuel briquettes, the combination with the oven proper, of a heat distributing chamber located near the intake end of the oven but spaced from the walls thereof, an endless conveyor for moving the briquettes through the oven, means for guiding said conveyor to move from the entrance thereof directly upwardly to the top of the oven over said chamber and then horizontally back and forth downwardly in the oven, the upwardly extending strand of the conveyor at the intake end being located between said chamber and the adjacent end wall of the oven, and a series of horizontal partitions alternately extending from a point at one end to a point at a distance from the other end of the oven and each located between two adjacent strands of the conveyor.

2. In an oven for baking fuel briquettes, the combination with the oven proper, of a heat distributing chamber located near the intake end of the oven but spaced from the walls thereof, an endless conveyor for moving the briquettes through the oven, means for guiding said conveyor to move from the entrance thereof directly upwardly and then horizontally back and forth downwardly in the oven, the upwardly extending strand of the conveyor at the intake end being located between said chamber and the end wall of the oven, a series of horizontal partitions alternately extending from a point at one end to a point at a distance from the other end of the oven and each located between two adjacent strands of the conveyor, valved outlets from said chamber for delivering heated products of combustion to the different strands of the conveyor, and outlets from the oven at the other end for the different strands of the conveyor to insure that the heated products will pass along a strand of the conveyor from one end of the oven to the other and then directly out of the oven so that they will not mix with the heated gases surrounding the other strands of the conveyor.

HENRY F. MAUREL.